US005087821A

United States Patent [19]

Maitrejean et al.

[11] Patent Number: 5,087,821

[45] Date of Patent: Feb. 11, 1992

[54] METHOD AND APPARATUS FOR LOCATING PHOTONS OR NEUTRAL PARTICLES TWO-DIMENSIONALLY, IN PARTICULAR AT LOW COUNTING RATES

[75] Inventors: Serge Maitrejean, Paris; Mario Ruscev, Cachan; Irène Dorion, Paris, all of France

[73] Assignee: Schlumberger Industries, Montrouge, France

[21] Appl. No.: 678,279

[22] PCT Filed: Oct. 24, 1989

[86] PCT No.: PCT/FR89/00553

§ 371 Date: Apr. 26, 1991

§ 102(e) Date: Apr. 26, 1991

[87] PCT Pub. No.: WO90/04851

PCT Pub. Date: May 3, 1990

[30] Foreign Application Priority Data

Oct. 28, 1988 [FR] France ..... 88 14186
Oct. 28, 1988 [FR] France ..... 88 14187

[51] Int. Cl.[5] ..... G01T 1/185; G01T 3/00

[52] U.S. Cl. ..... 250/385.1; 250/374; 250/390.01; 250/390.02

[58] Field of Search ..... 250/385.1, 390.01, 390.02, 250/374

[56] References Cited

U.S. PATENT DOCUMENTS 4,816,683 3/1989 Marsden ..... 250/385.1

FOREIGN PATENT DOCUMENTS 271 1/1979 European Pat. Off. .
228933 7/1987 European Pat. Off. .

OTHER PUBLICATIONS

Bateman et al., "A Hybrid MWPC Gamma Ray Detecting System for Applications in Nuclear Medicine", Nuc. Instru. and Methods, 156, 1978, pp. 27-31.

Dorion et al., "A Novel Unidimensional Position Sensitive Multiwire Detector", IEEE Trans Nucl. Sci, NS-34 (1), Feb. 1, 1987, pp. 442-443.

Anderson et al., "A Versatile Helium-Filled Detector Using Thin Foils for Converting Low Energy Gamma Rays to Electrons", Nucl. Instru. and Methods, 167, 1979, 351-354.

*Primary Examiner*—Carolyn E. Fields
*Attorney, Agent, or Firm*—Sanford J. Asman

[57] ABSTRACT

The invention relates in particular to a detector for two-dimensional analysis of a flux of photons or neutral particles. The detector comprises a solid plane converter (5) constituted by a two-dimensional matrix of cells (such as 9*c*), an array of charge-multiplying wires (6) using stimulated ionization of a gas, and a cathode grid (7). The cells both convert the photons or neutral particles and collect the charge, and the ionization is preferably stimulated until self-regulating streams of electrons appear (streamer mode).

The invention has application to imaging devices.

14 Claims, 2 Drawing Sheets

METHOD AND APPARATUS FOR LOCATING PHOTONS OR NEUTRAL PARTICLES TWO-DIMENSIONALLY, IN PARTICULAR AT LOW COUNTING RATES

The present invention relates in particular to a device for detecting and locating particles in a flux of neutral particles emitted by a source, the device comprising:

a substantially plane solid converter suitable for producing electrical charges under the impact of said neutral charges, the converter comprising conversion elements which are electrically independent from one another;

anode wires for raising to an electric potential different from that of the converter to cause an electric field to appear, and for amplifying charges by ionizing a surrounding gas under stimulation from said electric field;

charge collecting means comprising conductor elements that are electrically independent from one another, with at least some of them constituting conversion elements; and an enclosure permeable to the neutral particles and containing the converter, the anode wires, the charge collecting means, and the gas.

A device of this type is described in the European patent application published under the number 0 000 271.

Although this prior art device makes it possible to obtain two-dimensional images directly, its design is based on an attempt at optimizing efficiency in certain particular applications to the detriment of optimizing resolution.

In contrast, an aim of the present invention is to make it possible to provide images of higher resolution, and also to obtain high contrast, where possible, even under conditions that are a priori unfavorable for irradiating the object to be examined, and more particularly in the event of poor conversion rates and/or in the presence of an incident particle flux of low intensity.

To this end, the apparatus of the invention is essentially characterized in that said conversion elements also suitable for collecting charge are constituted by cells distributed over a plane two-dimensional matrix disposed on the opposite side of the anode wires to the source.

By virtue of this disposition, the images obtained by the device of the invention have higher resolution than the images obtained using the prior art device described in the patent EP 0 000 271, in which the two-dimensional matrix is made up of tow parallel planes of linear components which are parallel to one another in each plane, while the components in the two different planes cross one another.

Because of the spacing between the two planes which together form the two-dimensional matrix, and because of the parallax error resulting therefrom, this prior art disposition gives rise to different deformations in the partial images collected on the two planes for any radiation that is not perpendicular to the matrix, and this significantly degrades resolution.

In an advantageous embodiment of the invention, the converter comprises an insulating plate having one face carrying said cells, said plate including, for each cell, a through hole putting said cell into electrical contact with a conductor leading to the other face of said plate.

In a disposition which is known per se, it is preferable in the invention for the anode wires to be disposed in at least one plane substantially parallel to the plane of the converter, and for them to be substantially parallel to one another.

Given the disposition adopted in the invention, in order to obtain good efficiency, it is preferable for the cells to include a conversion material selected from the group comprising: gadolinium, boron, and lithou, in the event that the neutral particles used are neutrons; and for the cells to include a conversion material selected from the group comprising: iron, and silver, in the event that the neutral particles used are X-rays, in particular soft X-rays.

In the event of the counting rate being particularly low, for whatever reason, it is advantageous for the gas to contain a quencher constituting not less than 25% of the gas and for the ratio of the distance "S" between two adjacent anode wires to the distance "G" between these wires and the converter to be not less than 1.

These characteristics enable the device to operate in a mode known to the person skilled in the art by the English term "self-quenching mode" which is characterized by the appearance of electron avalanches that pile up to a charge cloud of critical size at which they quench.

The particular advantages developed be this mode of operation (known elsewhere) in the specific application of the invention will be better understood from reading the detailed description thereof.

Preferably, at least one of said charge collecting elements is connected to a reference electrical potential via a capacitor suitable for accumulating the charge collected by said element.

Such charge integration contributes to compensating for the negative effects associated with low count rate particle fluxes.

Preferably, the device also includes a voltage source suitable for creating an electric voltage between the cathode and the anode wires of not less than 2,000 volts, and the anode wires preferably have a minimum diameter that is greater than 20 microns.

The invention also provides a method of detecting and locating particles in a flux of neutral particles emitted by a source, the method comprising the operations consisting in:

receiving said particles on a substantially plane solid converter, thereby producing electrical charges from said neutral particles;

amplifying said charges by stimulated ionization of a surrounding gas; and collecting the charges present in at least one plane substantially parallel to the converter on the converter at different locations that are spaced apart from one another;

the method being characterized in that said locations constitute a plane two-dimensional matrix.

For low counting rates, the charge amplifying operation preferably comprises applying an electric field of sufficient strength to enable electron avalanches of self-regulating size to appear.

The method may advantageously include another operation consisting in accumulating the collected electric charges over a certain period of time.

The neutral particles are preferably converted into electric charges at a conversion rate such that the number of particles detected is less than $10^5$ particles per second and per square centimeter of converter area.

For reasons given in detail in the description below, the method is particularly suitable for use with thermal neutrons as the neutral particles.

Other characteristics and advantages of the invention appear clearly from the description made thereof below by way of non-limiting example and with reference to the accompanying drawings, in which:

FIG. 1 shows a source 1 of neutral particles, e.g. a source of soft X-rays, but more typically in the main applications of the invention, a source of thermal neutrons.

At least a portion of the particle flux emitted by said source passes through an object to be examined 2 and reaches the device 3 to which the present invention applies more particularly.

Figure 2:
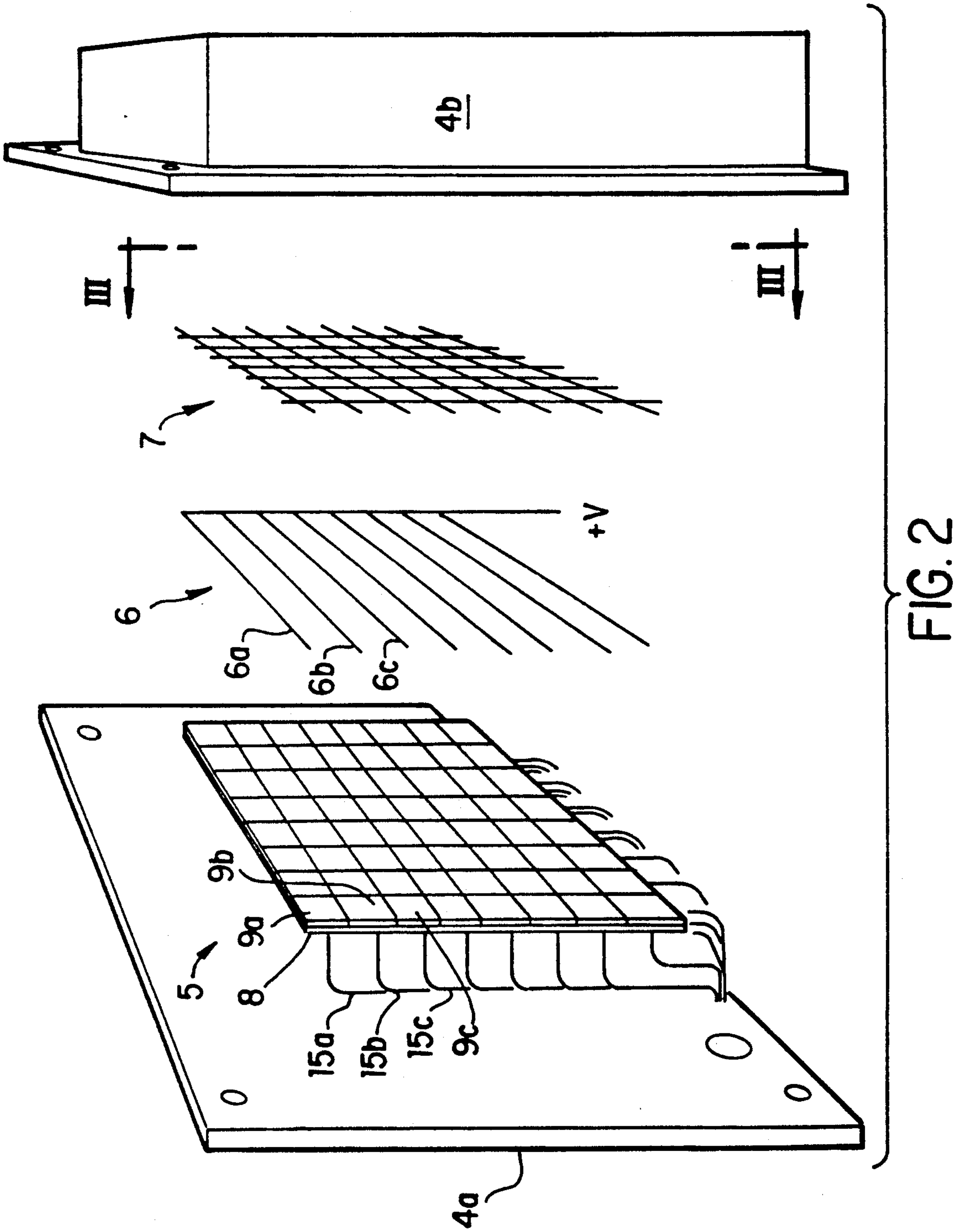
FIG. 2 is a diagrammatic exploded view of a device of the invention.

As shown in greater detail in FIG. 2, the device 3 essentially comprises an enclosure for enclosing a gas and constituted by a base 4*a* and a cover 4*b* which are fixed to each other in gastight manner relative to the atmosphere, while the cover 4*b* is nevertheless permeable to the neutral particles emitted by the source 1, e.g. to neutrons.

The gas contained in the enclosure is a mixture of gases enabling "streamer" operating mode to appear, in other words enabling avalanches of electrons to appear of a size that is self-regulating by spontaneous quenching.

To this end, the gas includes an efficient quencher constituted by polyatomic carbon-containing molecules having numerous relaxation modes, such as isobutane or neopentane, and constituting not less than 25% of the gas.

For example, the gas may be a mixture of 50% carbon dioxide and 50% isobutane, subjected to a pressure of about 1 bar to about 5 bars.

The following are disposed inside the enclosure, and parallel to the base:

a substantially plane solid converter 5 which is suitable for producing electrical charges under impact from the neutral particles;

a plane array 6 of conductor wires such as 6*a*, 6*b* disposed parallel to the converter and at a distance therefrom; and preferably, a plane grid of conductor wires 7 itself disposed as a distance from the array 6.

The converter 5 and the plane grid are connected to a reference electrical potential and, for example, they may be at potentials close to ground potential as it exists outside the enclosure, with both of them acting as cathodes.

In contrast, the wires in the plane array 6 are connected to an external source of electrical potential which delivers a potential +V which is positive relative to the mean potentials of the converter 5 and of the grid 7, e.g. in the range about 2,000 volts to about 7,000 volts.

The converter 5 comprises an insulating plate 8 (more clearly visible in FIG. 3), and a two-dimensional matrix of cells such as 9*a*, 9*b*, 9*c* disposed on one of the faces of the plate 8.

Each of the cells such as 9*a* is intended to provide a signal representing one point of a two-dimensional image of the object 2.

Each of the cells thus operates independently from its neighbors, and the resulting image is constituted by a matrix of points, each of which corresponds to one of the cells.

The light intensity associated with an image point depends on the quantity of particles received by the corresponding cell, which quantity is itself dependent on the thickness and the nature of the material constituting the object within the solid angle delimited by the source at one end and the cell in question at the other.

Figure 3:
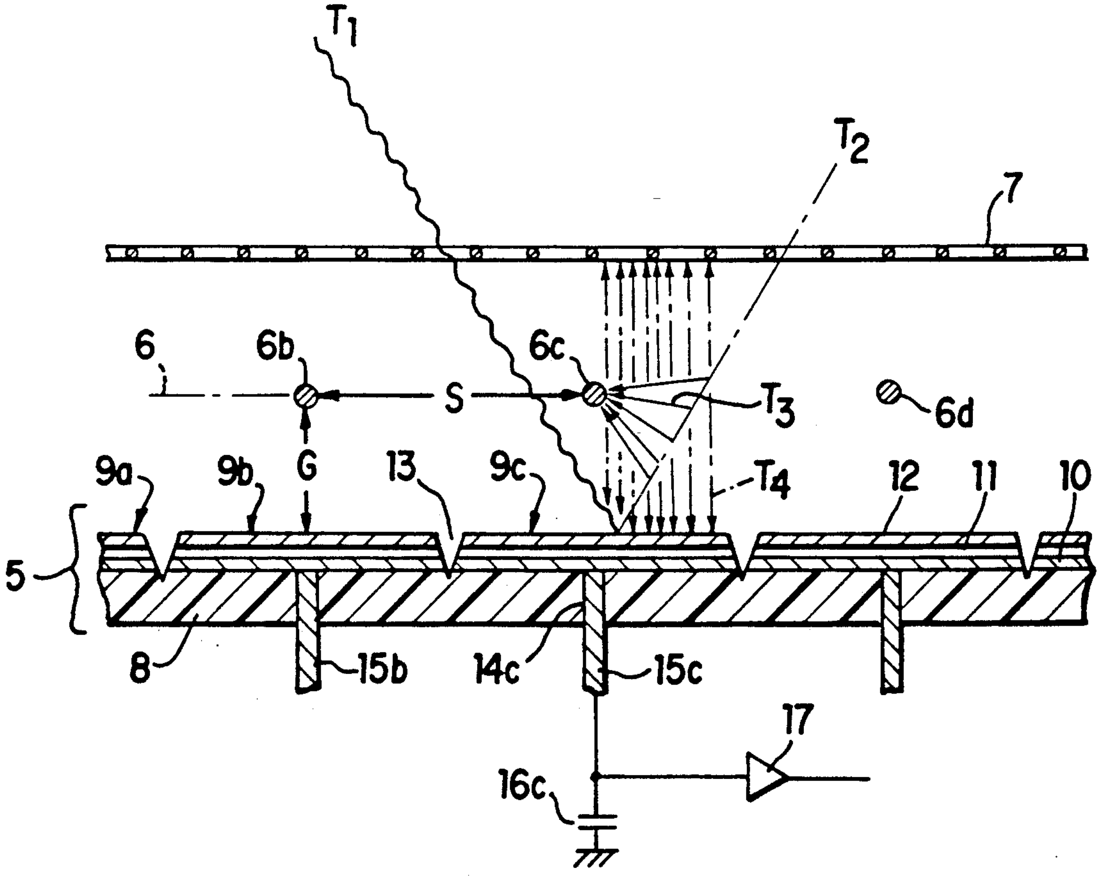
FIG. 3 is a section view through a detector device for use in the system of FIG. 1, with the section being on plane III—III of FIG. 2.

Operation of the device is shown in FIG. 3.

Wavy line T1 represents the path of a neutral particle (e.g. a neutron) which, after being emitted by the source 1 and after passing through the object 2, the cover 4*b* of the detector, the grid 7, and the plane of wires 6, reaches a cell 9*c* in the converter 5.

Struck by this neutral particle, the cell 9*c* which is made of a suitable material, emits a fast electron in a statistically observable and reproducible manner and the trajectory of this electron is represented by T2.

As it travels through the enclosure, this fast electron ionizes the gas on its path, and electrons produced in this way drift towards the closest wire (e.g. 6*c*) of the array 6 under the effect of the electric field resulting from the potential difference between the converter 5 and the plane of the wires 6. This motion is represented by arrows such as T3 in FIG. 3.

On coming within a few diameters of the wire 6*c*, these electrons are accelerated very hard by the electric field whose value increases considerably in the immediate vicinity of the wire.

They therefore acquire sufficient energy to ionize the gas in turn, thus achieving electron amplification.

According to a characteristic of the invention, this amplification corresponds to an operating mode in which avalanches of electrons appear of a size that is self-quenching.

This phenomenon continues, giving rise to a considerable increase in the electrical charge as represented by the final number of electrons produced by each fast electron, until the avalanches quench spontaneously.

The corresponding positive ions representing the same number of charges as the charges constituted by all of the electrons that are created move away from the wire 6*c* from which they are repelled because of their charge, and they drift towards the closest of the cathodes, constituted by the grid 7 on one side and by the converter 5 on the other.

The positive ions created on the grid side are collected by the grid while those created on the same side as the converter 5 are collected by one of the cells thereof, and in particular by the cell 9*c* in this case. Their motion is represented in FIG. 3 by dotted line arrows T4.

As shown in FIG. 3, the converter 5 has a layer structure supported by an insulating plate 8, which plate may be constituted, for example, by an epoxy resin printed circuit card having a thickness of 3.2 millimeters.

The top surface of this plate is covered in layer of copper 10 which is a few microns thick.

A layer of conducting adhesive 11 is deposited on the layer of copper 10, thereby enabling the assembly to be covered in a layer of conversion material 12 e.g. gadolinium foil, having a thickness of one-tenth of a micron, and previously gold-plated to avoid oxidation.

This stack of layers 10, 11, and 12 deposited over at least the major portion of the surface of the plate 8 is then cut up by saw cuts such as 13 made in the top face of the plate, to provide elements that are electrically isolated from one another and which constitute the cells 9*a*, 9*b*, 9*c*, etc.

In addition, for each cell such as 9*c*, the insulating plate 8 includes a through hole such as 14*c* putting said cell into electrical contact with a conductor such as 15*c* leading to the opposite face of the plate 8.

Each wire such as 6*c* is preferably tensioned exactly over a row of cells such as 9*c*, which cells are advantageously rectangular or square in shape.

For example, the cathode grid 7 may be made up of stainless steel wires having a diameter of 50 microns each, crossing at right angles, and at a pitch of 500 microns, with the purpose of this grid being to make the electric field around the wires such as 6*c* symmetrical.

The plane of the wires 6 is implemented in the form of a sheet of gold-plated tungsten wires having a minimum diameter of not less than 20 microns, and preferably lying in the range 50 microns to 100 microns, placed on an insulating support and running parallel to one another at a pitch S of 2.54 millimeters, for example. The set of wires is connected to a source external to the enclosure 3, and delivering electrical potential at 5,000 volts, for example.

The distance G between the plane of wires 6 and the converter 5, and the distance between the plane of wires 6 and the grid 7 are preferably equal to each other and lie in the range about 3 millimeters to about 5 millimeters.

The cells such as 9*c* are, for example, in the form of squares having a side of 2 millimeters, and provided at the same pitch as the wires, namely 2.54 millimeters.

The conversion material 12 used in the cells such as 9*c* is advantageously constituted by gadolinium when the neutral particles emitted by the source 1 are thermal neutrons, and by iron or silver when the particles are X-rays, in particular soft X-rays.

The conductors such as 15*c* are connected firstly to ground potential via respective capacitors such as 16*c* and secondly, at least during a given time interval, to a conventional electronic device 17 whose function is to convert the signal present on each of these conductors into a point of a video image and/or into data suitable for being stored in an optical, electronic, or other memory.

Under the conditions described, the wires such as 6*c* act as means for amplifying and collecting negative charge, while the converter and its cells act simultaneously as conversion means, cathode means, and means for collecting positive charge.

Insofar as the useful signal for each image point of the object is constituted by the electrical signal present on conductors such as 15*c*, the cells such as 9*c* constitute, more particularly, the useful elements of the charge collecting means.

The invention is particularly advantageous when the number of detected neutral particles is less than $10^5$ particles per second and per square centimeter of converter area, and it is particularly advantageous when the detected particles are thermal neutrons.

As mentioned above, the charge amplifying operation comprises applying an electric field of sufficient value to enable avalanches of electrons to appear that are self-regulating in size (streamer mode), and to this end it is advantageous for the ratio of the distance S (FIG. 3) between two adjacent anode wires 6*b* and 6*c*, to the distance G between these wires and the cathode 12 to be not less than 1.

The advantage of streamer operating mode for a detector applied to image making in accordance with the invention is based on the following two reasons.

Figure 1:
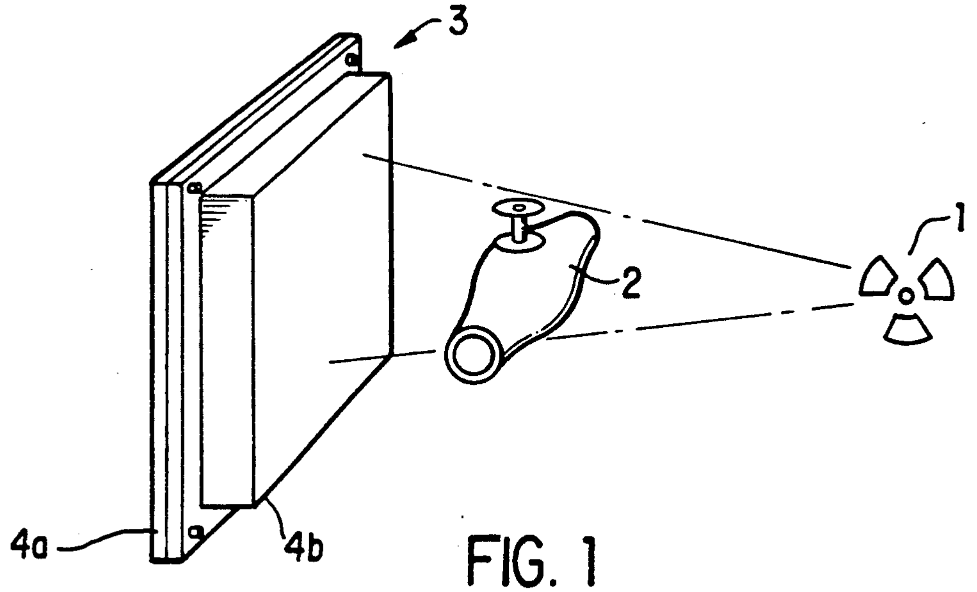
FIG. 1 is a diagrammatic perspective view showing an embodiment of a device of the invention.

Firstly, this mode makes it possible to create an extremely high number of charges, typically about $10^7$ or $10^9$ for each fast electron emitted by the converter, thus making it possible to obtain an image of an irradiated object such as 2 (FIG. 1), even on the basis of a small number of particles received by the collector or of a small number of particles converted thereby. This property is additionally exploited to the full in the embodiment of the invention which includes using a capacitor such as 16*c* to accumulate the collected electrical charges over a certain length of time.

Secondly, and above all, this mode of operation serves to mitigate an intrinsic defect presented by solid converters under certain operating conditions, in particular when detecting thermal neutrons.

Although the number of fast electrons created from a predetermined number of incident neutrons is constant, statistically at least, the fast electrons coming from a solid converter nevertheless suffer from very wide energy dispersion.

Unfortunately, the number of first ionization charges directly created per unit distance by a fast electron passing through a gas is a steeply varying function of the energy of the fast electron, such that the charge-collecting elements, in particular the cells such as 9*c* in this case, run the risk of providing respective signals that are not representative of the number of neutral particles these elements have received, but that are representative of the energies of the fast electrons to which these particles have given rise by conversion.

Streamer mode which has the property of amplifying charge in a highly non-linear manner makes it possible to correct for this defect by ensuring that each fast electron gives rise to a number of collected charges that is substantially independent of the number of first ionization charges that are directly created by the fast electrons. Using this mode of operation thus serves to ensure that fluctuations in the useful signal are at a level close to the Poisson fluctuations of the source.

I claim:

1. A device for detecting and locating photons or neutral particles in a flux of photons or neutral particles emitted by a source (1), the device comprising:
   - a substantially plane solid converter (5) suitable for producing electrical charges under the impact of said photons or neutral particles, the converter comprising conversion elements (9*a*, 9*b*, 9*c*) which are electrically independent from one another;
   - anode wires (6*a*, 6*b*) for raising to an electric potential different from that of the converter to cause an electric field to appear, and for amplifying charges by ionizing a surrounding gas under stimulation from said electric field;
   - charge collecting means (9*c*, 15*c*) comprising conductor elements that are electrically independent from one another, with at least some of them constituting conversion elements; and
   - an enclosure (4*a*, 4*b*) permeable to the photons or neutral particles and containing the converter, the anode wires, the charge collecting means, and the gas;

the device being characterized in that said conversion elements for collecting charge are constituted by cells distributed over a plane two-dimensional matrix disposed on the opposite side of the anode wires to the source.

2. A device according to claim 1, characterized in that the converter comprises an insulating plate (8) having one face carrying said cells, said plate including, for each cell, a through hole (14c) putting said cell into electrical contact with a conductor (15c) leading to the other face of said plate.

3. A device according to claim 1, characterized in that said anode wires are disposed in at least one plane (6) substantially parallel to the plane of the converter, and are substantially parallel to one another.

4. A device according to claim 1, characterized in that said cells comprise a conversion material selected from the group consisting of: gadolinium, boron, and lithium.

5. A device according to claim 1, characterized in that said cells comprise a conversion material selected from the group consisting of: iron and silver.

6. A device according to claim 1, characterized in that the gas contains a quencher constituting not less than 25% thereof, and in that the ratio of the distance (S) between two adjacent anode wires (6b, 6c) to the distance (G) between these wires and the converter (5) is not less than 1.

7. A device according to claim 6, characterized in that at least one of said charge collecting elements is connected to a reference electrical potential via a capacitor (16c) suitable for accumulating the charge collected by said at least one of said charge collecting elements.

8. A device according to claim 1, characterized in that it includes a voltage source suitable for establishing an electrical potential of not less than 2,000 volts between the cathode and the anode wires.

9. A device according to claim 1, characterized in that the anode wires (6a, 6b, 6c) have a minimum diameter of not less than 20 microns.

10. A method of detecting and locating photons or neutral particles in a flux of photons or neutral particles emitted by a source (1), the method comprising the operations of:

receiving said photons or neutral particles on a substantially plane solid converter (5), thereby producing electrical charges from said photons or neutral particles;

amplifying said charges by stimulated ionization of a surrounding gas; and collecting the charges present in at least one plane substantially parallel to the converter and on the converter at different locations that are spaced apart from one another;

the method being characterized in that said locations constitute a plane two-dimensional matrix.

11. A method according to claim 10, characterized in that the operation of amplifying the charges comprises applying an electric field of sufficient value to enable electron avalanches of self-regulating size to appear.

12. A method according to claim 10, further comprising accumulating the collected electrical charge over a certain length of time.

13. A method according to claim 10, characterized in that the photons or neutral particles are converted into electrical charges with a conversion rate such that the number of detected photons or neutral particles is less than $10^5$ particles per second and per square centimeter of converter area.

14. A method according to claim 10, characterized in that the neutral particles essentially comprise thermal neutrons.

* * * * *